US012280455B2

(12) United States Patent
Moceri

(10) Patent No.: US 12,280,455 B2
(45) Date of Patent: Apr. 22, 2025

(54) TOWER FOR JOINING ELEMENTS OF UNDERWATER PIPE FOR TRANSPORTING FLUIDS

(71) Applicant: SAIPEM S.A., Montigny le Bretonneux (FR)

(72) Inventor: Liborio Moceri, Lommoye (FR)

(73) Assignee: SAIPEM S.A., Montigny Le Bretonneux (FR)

( * ) Notice: Subject to any disclaimer, the term of this patent is extended or adjusted under 35 U.S.C. 154(b) by 0 days.

(21) Appl. No.: 18/525,195

(22) Filed: Nov. 30, 2023

(65) Prior Publication Data

US 2024/0091889 A1    Mar. 21, 2024

Related U.S. Application Data

(62) Division of application No. 17/310,251, filed as application No. PCT/FR2019/052679 on Nov. 12, 2019.

(30) Foreign Application Priority Data

Jan. 30, 2019 (FR) ...................................... 1900887

(51) Int. Cl.
*B23K 37/053* (2006.01)
*B23K 37/0533* (2025.01)
(Continued)

(52) U.S. Cl.
CPC .......... *B23K 37/0533* (2013.01); *F16L 1/161* (2013.01); *F16L 1/206* (2013.01); *F16L 1/207* (2013.01)

(58) Field of Classification Search
CPC ....... F16L 1/12; F16L 1/18; F16L 1/19; F16L 1/161; B23K 37/0533; B63B 35/03
See application file for complete search history.

(56) References Cited

U.S. PATENT DOCUMENTS 3,598,369 A    8/1971  Yielding
4,214,692 A  *  7/1980  Le Garfe ................ F16L 1/202
                                                    228/44.5
(Continued)

FOREIGN PATENT DOCUMENTS

GB        2362696 A        11/2001
WO    2012101232 A2        8/2012
(Continued)

OTHER PUBLICATIONS

Search Report from corresponding FR Application No. FR1900887, Oct. 16, 2019.
(Continued)

*Primary Examiner* — Erin B Saad
*Assistant Examiner* — Carlos J Gamino
(74) *Attorney, Agent, or Firm* — Workman Nydegger

(57) ABSTRACT

A device for jointing elements of a pipeline for the transport of fluids includes a support structure on which a pipeline section to be jointed is intended to be mounted, two parallel fixed rails, four plates each comprising a first element capable of cooperating with a rail and a second element fixed on the support structure. The first and the second elements of each plate is linked by a first cylinder aligned along a first adjustment axis and a second cylinder aligned along a second adjustment axis, and a system for controlling the cylinders of the plates to achieve movements along the first and second adjustment axes and capable of cooperating with a system for guiding in translation the support structure along the longitudinal axis of the pipeline section to allow jointing of the pipeline section and the pipeline element.

9 Claims, 9 Drawing Sheets

(51) Int. Cl.
*F16L 1/16* (2006.01)
*F16L 1/20* (2006.01)

(56) References Cited

U.S. PATENT DOCUMENTS

| | | | | |
|---|---|---|---|---|
| 6,098,866 | A * | 8/2000 | Tsuchiya | B23K 37/0533 |
| | | | | 269/239 |
| 6,184,493 | B1 * | 2/2001 | Tsuchiya | B23K 13/015 |
| | | | | 219/161 |
| 6,293,732 | B1 * | 9/2001 | Baugh | F16L 1/19 |
| | | | | 405/166 |
| 6,364,573 | B1 * | 4/2002 | Baugh | B63B 35/03 |
| | | | | 405/165 |
| 6,592,297 | B2 * | 7/2003 | Frijns | F16L 1/207 |
| | | | | 405/169 |
| 7,815,093 | B2 * | 10/2010 | Hees | F16L 1/19 |
| | | | | 228/103 |
| 10,591,088 | B2 * | 3/2020 | Bianchi | F16L 1/19 |
| 10,788,147 | B2 * | 9/2020 | Bonel | F16L 1/207 |
| 2002/0021943 | A1 | 2/2002 | Frijns | |
| 2012/0174372 | A1 * | 7/2012 | Dagenais | B23Q 16/00 |
| | | | | 29/428 |
| 2012/0195716 | A1 * | 8/2012 | Nouwens | F16L 1/203 |
| | | | | 414/22.55 |
| 2013/0145590 | A1 * | 6/2013 | Brouwer | B23K 37/0533 |
| | | | | 29/721 |

FOREIGN PATENT DOCUMENTS

| | | |
|---|---|---|
| WO | 2012112863 A2 | 8/2012 |
| WO | 2016026969 A1 | 2/2016 |
| WO | 2018002907 A2 | 1/2018 |

OTHER PUBLICATIONS

International Search Report and Written Opinion from corresponding PCT Application No. PCT/FR2019/052679, Mar. 16, 2020.

* cited by examiner

[Fig. 1]
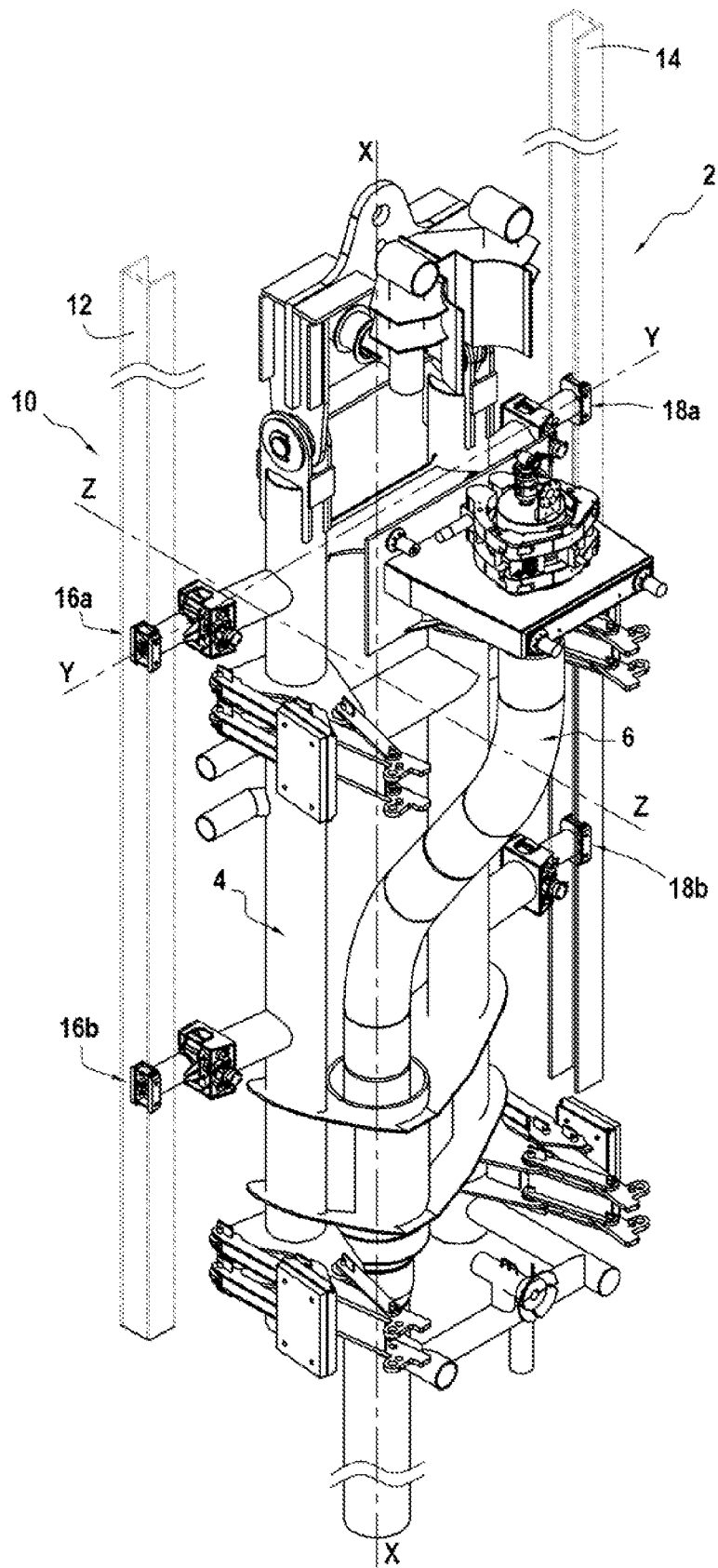

[Fig. 2]
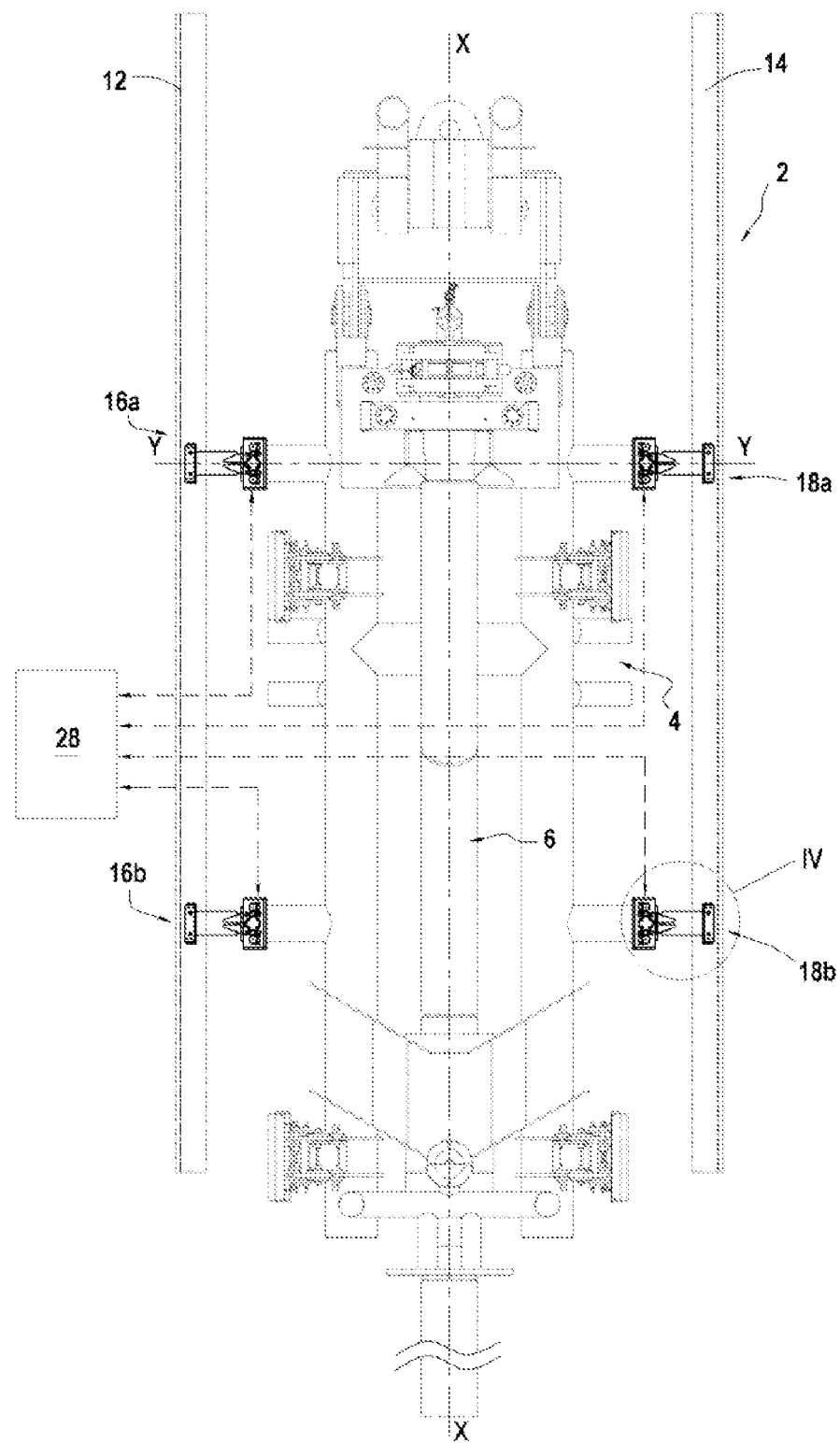

[Fig. 3]
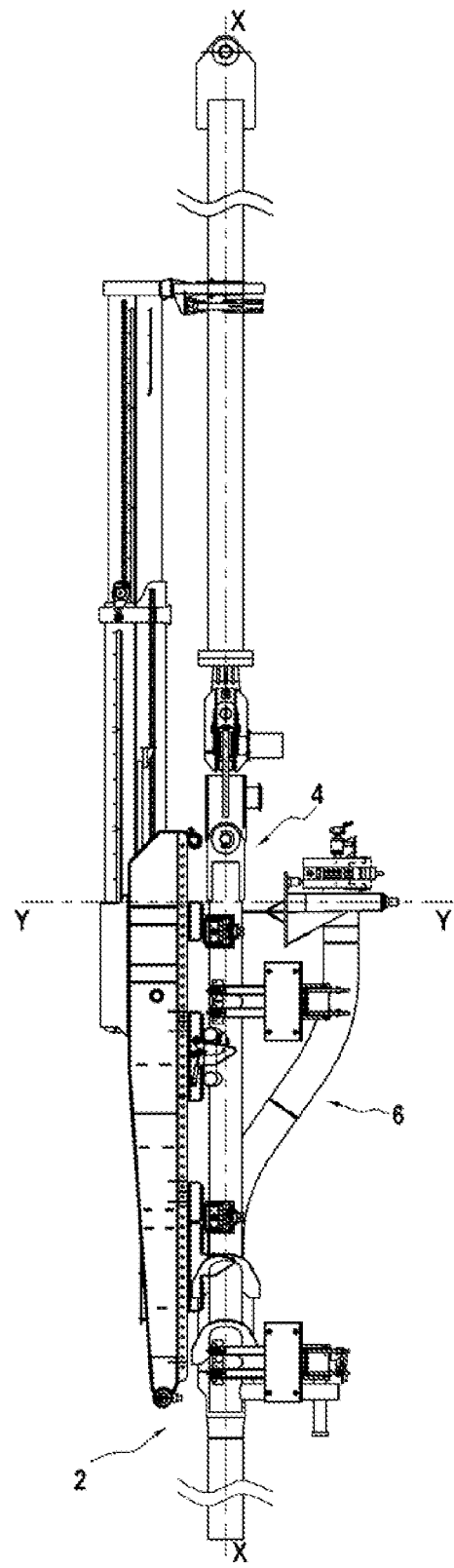

[Fig. 4]
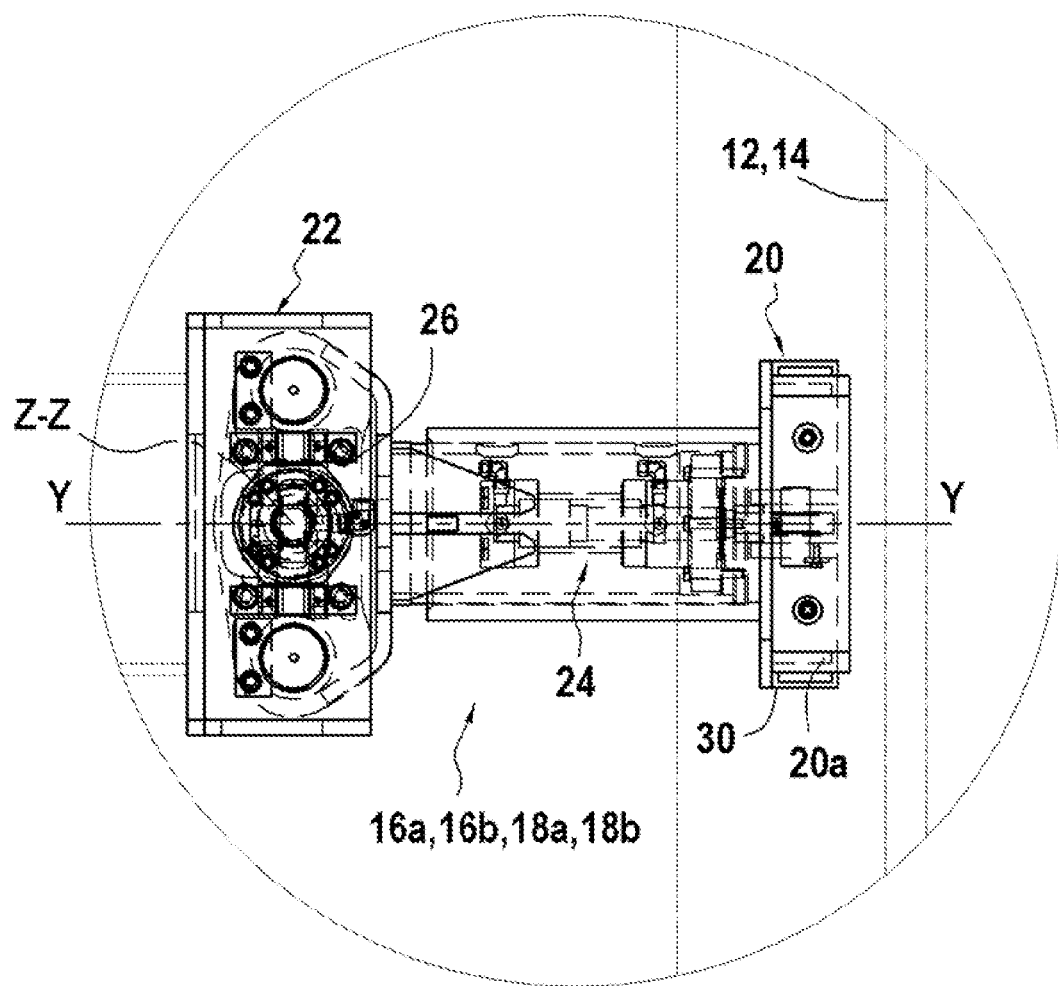

[Fig. 9A-9B]
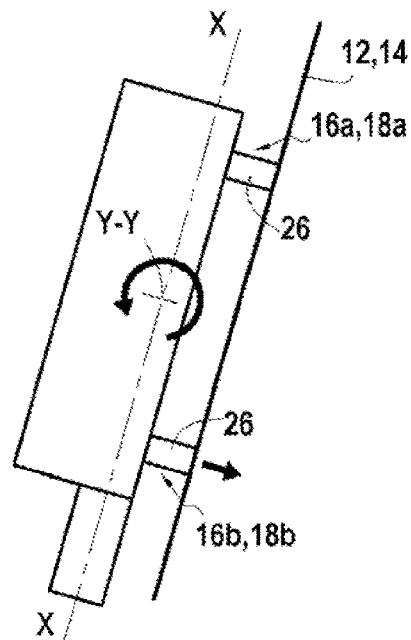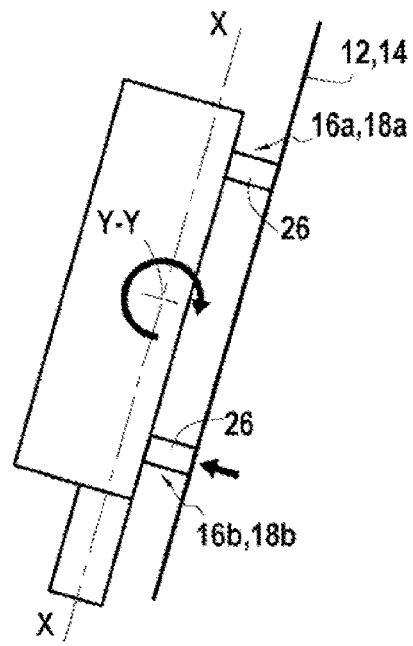
Fig. 9AFig. 9B
[Fig. 10A-10B]
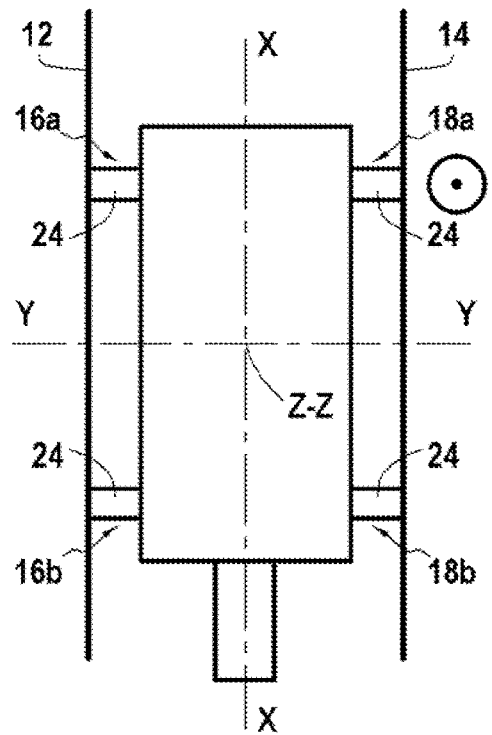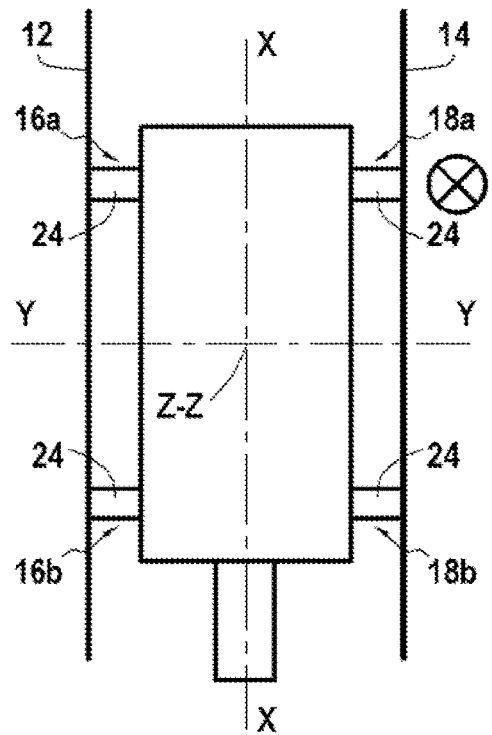
Fig. 10AFig. 10B

TOWER FOR JOINING ELEMENTS OF UNDERWATER PIPE FOR TRANSPORTING FLUIDS

TECHNICAL FIELD

The present invention relates to the general field of the construction and laying of single or multi-shell subsea pipelines resting on the seabed or ensuring the bottom-surface linking for the transfer of hydrocarbons, in particular oil and gas, coming from subsea production wells. It relates more particularly to the jointing of elements of such subsea pipelines.

PRIOR ART

The subsea pipelines for the transfer of hydrocarbons, in particular oil and gas coming from subsea production wells, are generally laid directly at sea. Typically, during the laying of a subsea pipeline at sea, one end of the laid pipeline is held on a laying vessel in order to weld a pipeline section on this end of the pipeline (this is called jointing of a pipeline section). Once the weld is complete, the lengthened pipeline is lowered to the sea, the laying vessel is moved forward and the operation can be repeated for a new pipeline section. Alternatively, the pipeline can be unwound from a first reel on which it has been wound onshore beforehand then lengthened by successive lengths from a plurality of reels.

The pipeline sections are thus connected to each other on board a laying vessel and are lowered to the seabed as they are connected. This laying can be done by means of a J-lay or S-lay tower positioned on the laying vessel. With the J-lay, the subsea pipeline is typically lowered from the laying vessel substantially vertically (between +30° and −10° relative to the vertical). The J-lay is a simple catenary lay in which the quasi-vertical inclination of the pipeline decreases as it moves downwards until it matches the slope of the sea bottom. With the S-lay, the subsea pipeline is typically lowered from the laying vessel substantially horizontally and then bends to reach the sea bottom.

During the laying, the pipeline is subjected to high tensile loads due to the weight of the pipeline under the laying vessel. Furthermore, the pipeline is subjected to fatigue loads due to the motions of the sea and of the laying vessel. In addition, in some applications, the pipeline is subjected throughout its service life to sea currents, which further increases the load stresses it undergoes. To withstand such stresses and forces, the weld beads that are made between the different sections of the pipeline must be of very high quality.

Furthermore, the laying of subsea pipelines may require the jointing of other pipeline elements, such as for example of T-parts intended to provide the subsea pipeline with lateral branches typically used for a future connection to equipment or wellheads, or of one end part that ends the subsea pipeline (referred to by PLET for "pipeline end termination").

The jointing of pipeline elements (such as pipeline sections, T-parts or end parts) is usually performed by means of a jointing device. This device ensures that one end of the pipeline element to be jointed is positioned relative to the end of the fixed pipeline in such a way that these ends can be linked to each other by means of a welded joint, a bolted connection or any other mechanical linkage for example.

In general, in the case of a J-lay, the jointing device present on the laying vessel comprises two assemblies, a fixed assembly and a mobile assembly. The fixed assembly consists of a motorized or non-motorized levitation collar for holding the subsea pipeline being laid. As to the movable assembly, it comprises the pipeline element to be jointed supported by a collar taking up the dead weight of this pipeline element, as well as two collars mounted on telescopic arms which are fixed to hinges secured to the lay tower in order to allow the lateral adjustment of the pipeline element by activation of cylinders in the plane perpendicular to the pipeline.

Such a device is thus based on the use of external collars capable of being moved from one pipeline end to the jointing plane. Reference may thus be made to publications WO 2016/026969, WO 2018/002907 and WO 2012/112863 which describe different architectures of jointing device with external collars positioned on either side of the jointing plane.

The jointing devices known from the prior art have a number of drawbacks. Particularly, the use of external collars on either side of the jointing plane requires a manual welding method, the space required for the installation of an automatic welding system being insufficient. However, apart from the time of execution of a manual welding, the weld quality is not always obtained. In addition, for the same reason, such jointing devices allow accommodating only end parts PLET which are relatively compact. Furthermore, for geometrical reasons, these devices, as well as those having a mandrel transportable inside the pipeline, are not adapted for pipelines comprising elbows with a large radius of curvature (typically on the order 5 times the diameter).

DISCLOSURE OF THE INVENTION

The main object of the present invention is therefore to propose a jointing device which does not have the aforementioned drawbacks.

According to the invention, this aim is achieved by means of a device for jointing elements of a pipeline for the transport of fluids, comprising: a support structure capable of being connected to a guide structure and on which a pipeline section to be jointed to a pipeline element is intended to be mounted; two parallel fixed rails; four plates each comprising a first element capable of cooperating with a rail and a second element fixed on the support structure, the first element and the second element of each plate being linked together by a first cylinder aligned along a first adjustment axis perpendicular to a longitudinal axis of the pipeline section and a second cylinder aligned along a second adjustment axis perpendicular to the longitudinal axis of the pipeline section and to the first adjustment axis; and a system for controlling the cylinders of the plates to achieve movements along the first and the second adjustment axis and capable of cooperating jointly with a system for guiding in translation the support structure along the longitudinal axis of the pipeline section so as to allow jointing of the pipeline section and of the pipeline element.

The jointing device according to the invention is remarkable in that the use of four plates each provided with cylinders along two perpendicular adjustment axes allows obtaining numerous possibilities of different combinations of rotations and translations of the support structure in order to facilitate the jointing. This results in great flexibility of use for the jointing. Furthermore, the device according to the invention allows providing sufficient space to perform an automatic welding that allows improving the quality of the weld and its execution time.

The device may comprise two plates fixed on one side of the support structure and each cooperating with the same rail, and two other plates fixed on an opposite side of the support structure and each cooperating with the other rail, the plates located on the same side of the support structure being spaced from each other along the longitudinal axis of the pipeline section.

In this case, the plates located on either side of the support structure are advantageously aligned in pairs with each other along the first adjustment axis.

The cylinders of the plates can be hydraulic cylinders which are linked to a hydraulic control system.

The device may further comprise a head support collar on which the support structure of the pipeline section is intended to be held and intended to take up the force generated during the translation of the support structure along the longitudinal axis of the pipeline section.

The first element of each plate cooperates advantageously with a rail via a wear part.

One object of the invention is also a tower for laying an subsea pipeline for the transport of fluids, comprising a jointing device as defined above.

One object of the invention is also a support for anchoring to the ground a pipeline for the transport of fluids, comprising a jointing device as defined above.

One object of the invention is also a method for jointing subsea pipeline elements for the transport of fluids by means of a pipeline jointing device as defined above comprising the successive steps of:

a/ mounting and locking the pipeline section to be jointed on the support structure of the jointing device;
b/ placing the first cylinder of each plate in the retracted position and deploying the second cylinder of each plate in the intermediate position;
c/ pivoting the support structure in the inclined position;
d/ clamping the head support collar on an extension of the support structure of the pipeline section and unlocking the pipeline section to be jointed from the support structure of the jointing device;
e/ engaging the first element of each plate in a rail;
f/ deploying the first cylinder of each plate to put the first element of each plate into abutment in the corresponding rail in order to stabilize the pipeline section; and
g/ controlling the cylinders of the plates in cooperation with the translational guidance of the support structure along the longitudinal axis of the pipeline section to perform jointing of a pipeline element with the pipeline section installed on the support structure.

Preferably, the method further comprises the locking in position of the cylinders of the plates once the jointing has been performed.

Also preferably, the control of the cylinders of the plates is synchronized, on the one hand for the two plates located in the upper portion of the support structure, and on the other hand for the two plates located in the lower portion of the support structure.

BRIEF DESCRIPTION OF THE DRAWINGS

FIG. 1 is a perspective view of a jointing device according to the invention.
FIG. 2 is a front view of the device of FIG. 1.
FIG. 3 is a side view of the device of FIG. 1.
FIG. 4 shows a plate of the device of FIG. 1.
FIG. 5A, FIG. 5B to FIG. 13A, FIG. 13B, FIGS. 5A, 5B to 13A, 13B schematically illustrate different possibilities of movements and rotations of the device of FIG. 1.

DESCRIPTION OF THE EMBODIMENTS

Figure 5A:
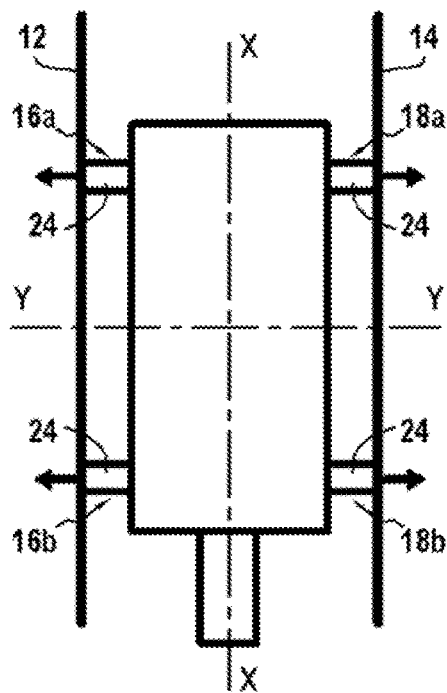

FIG. 1 represents in perspective a jointing device 2 according to the invention. Such a device can be associated with a lay tower (for example J-lay tower or S-lay tower—not represented in the figures) of a vessel for laying a subsea pipeline for the transfer of hydrocarbons, in particular oil and gas.

The jointing device 2 has the function of allowing the jointing between two elements of a subsea pipeline, for example between a pipeline being laid and a pipeline section or between a pipeline being laid and a T-part intended to provide the subsea pipeline with lateral branches typically used for a future connection to equipment or wellheads, or a pipeline being laid and an end part that ends the subsea pipeline (PLET).

The jointing device 2 according to the invention comprises a support structure 4 on which the subsea pipeline 6 to be jointed is mounted.

The jointing device also comprises a guide structure 10 which is mainly composed of two parallel fixed rails 12, 14. In practice, these rails 12, 14 of the guide structure are metal profiles with a U-shaped section which are mounted on the tower for laying the subsea pipeline. In one variant not represented in the figures, the rails form part of the support structure 4 on which the pipeline 6 is mounted.

The jointing device according to the invention further comprises a head support collar (not represented in the figures) on which the support structure 4 of the pipeline 6 is intended to be held. This head support collar allows taking up the force generated during the translation of the support structure along the longitudinal axis XX of the pipeline.

To this end, the jointing device further comprises a system (not represented in the figures) for guiding in translation the support structure 4 along the longitudinal axis XX of the pipeline. This guide system can be formed of a set of cylinders or any other device connected to the head support collar.

Furthermore, four plates allow ensuring a coupling of the support structure 4 on the two rails 12, 14 of the guide structure; namely two plates 16a, 16b (for example an upper plate 16a and a lower plate 16b) fixed on the same side of the support structure, spaced from each other along the longitudinal axis XX of the pipeline and each cooperating with the same rail 12; and two other plates 18a, 18b (for example an upper plate 18a and a lower plate 18b) fixed on the other side of the support structure, spaced from each other along the longitudinal axis XX of the pipeline and each cooperating with the other same rail 14.

As illustrated more specifically in FIG. 4, each plate 16a, 16b, 18a, 18b comprises a first element 20 which is capable of sliding in a rail 12, 14 of the guide structure and a second element 22 which is fixed on the support structure 4.

The first element 20 and the second element 22 of each plate are linked together by two separate cylinders; namely a first cylinder 24 aligned along a first adjustment axis YY which is perpendicular to the longitudinal axis XX of the pipeline, and a second cylinder 26 aligned along a second adjustment axis ZZ which is perpendicular to the longitudinal axis XX of the pipeline and to the first adjustment axis YY.

In this way, the longitudinal axis XX of the pipeline (on which the two fixed rails 12, 14 of the guide structure are aligned), the first adjustment axis YY and the second adjustment axis ZZ constitute the three axes of a reference frame of the jointing device according to the invention.

As represented in FIG. 4, the first element 20 of each plate 16a, 16b, 18a, 18b cooperates with a rail 12, 14 of the guide structure via a wear part 30. This wear part 30 is interchangeable when it becomes too damaged by repeated friction in the corresponding rail.

The first and second cylinders 24, 26 are for example hydraulic cylinders. In this case, these cylinders are all linked to a hydraulic control system 28 (FIG. 2) allowing actuating each cylinder in order to allow jointing of the pipeline element on the pipeline 6.

More specifically, the hydraulic control system 28 has the function of supplying hydraulic fluid to the chambers for controlling each cylinder 24, 26 in order to obtain the movements and the rotations of the support structure 4 in the defined reference frame by the adequate axes XX, YY, ZZ to joint the pipeline element and the pipeline.

Preferably, the control system 28 allows a control by pair of plates, that is to say a synchronized control of the respective cylinders of the plates, on the one hand for the two plates 16a, 18a located in the upper portion of the support structure, and on the other hand for the two plates 16b, 18b located in the lower portion of the support structure.

In relation to FIGS. 5A, 5B to 13A, 13B, the different possibilities of movements and rotations of the support structure 4 in the reference frame defined by the axes XX, YY, ZZ will now be described.

Figure 5B:
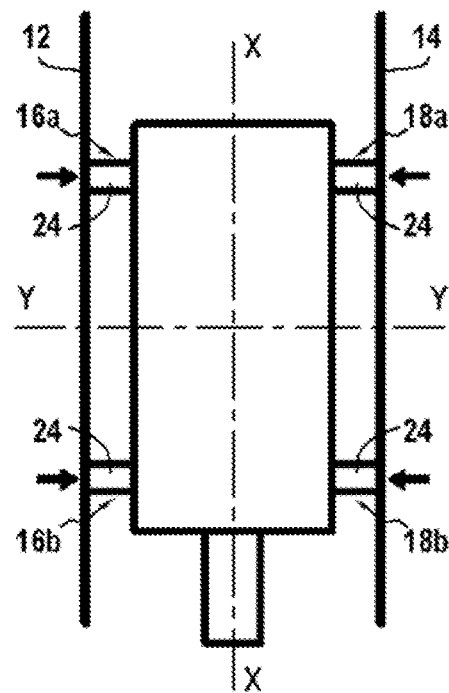

FIGS. 5A and 5B represent, schematically, movements of the support structure along the first adjustment axis YY. More specifically, in FIG. 5A, all of the first cylinders 24 are deployed, while in FIG. 5B, all of the first cylinders 24 are retracted.

Figure 6A:
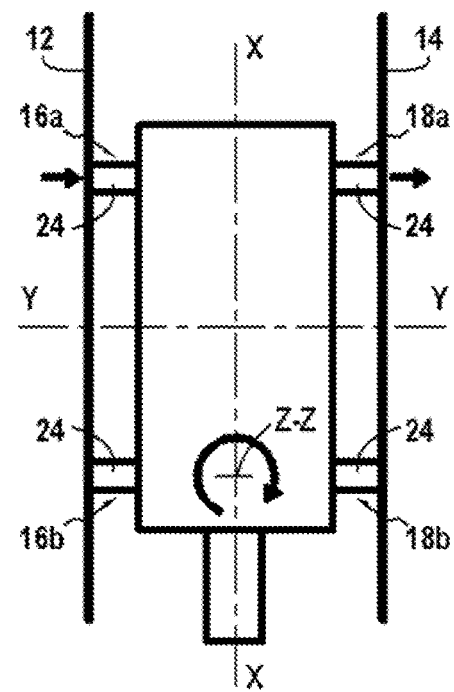
Figure 6B:
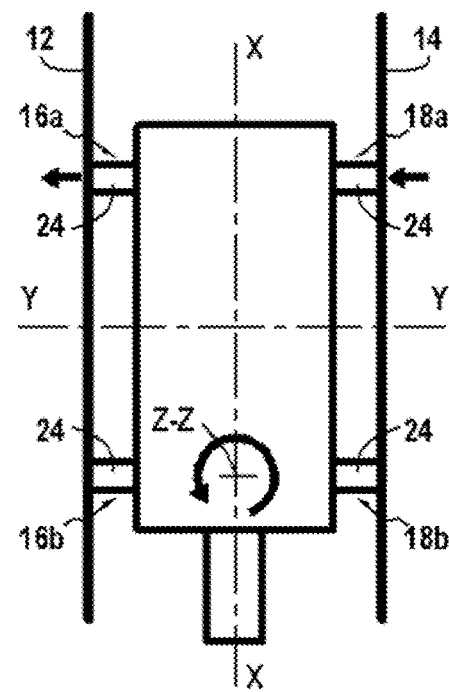

FIGS. 6A and 6B represent, schematically, rotations of the support structure about the second adjustment axis ZZ. More specifically, in FIG. 6A, the plates 16b and 18b remain inactive, while the first cylinder 24 of the plate 16a is retracted and the first cylinder 24 of the opposite plate 18a is deployed, which allows obtaining a rotation of the support structure about the second adjustment axis ZZ in the clockwise direction.

Conversely, in FIG. 6B, the plates 16a and 18b always remain inactive, while the first cylinder 24 of the plate 16a is deployed and the first cylinder 24 of the opposite plate 18a is retracted, which allows obtaining a rotation of the support structure about the second adjustment axis ZZ in the counterclockwise direction.

Figure 7A:
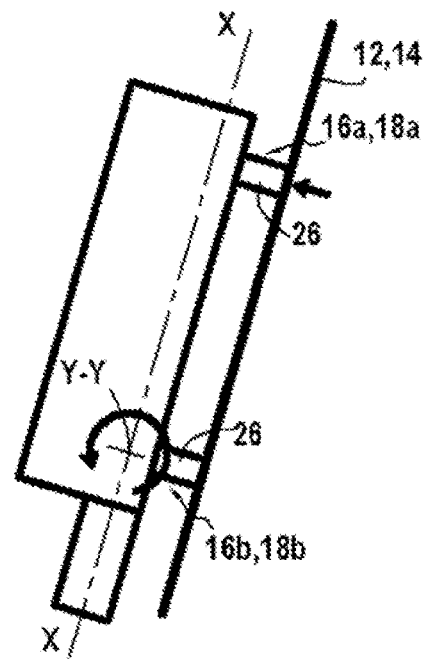
Figure 7B:
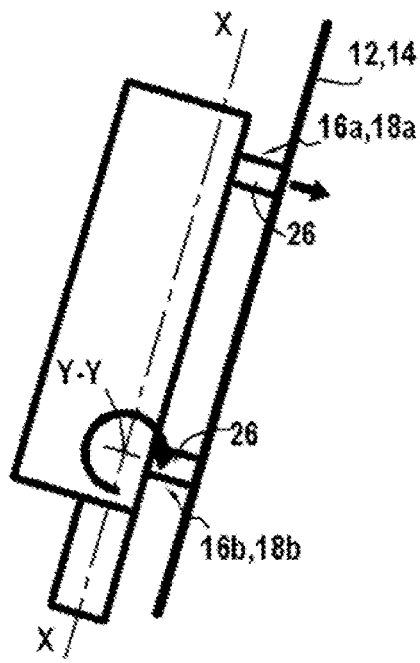

In the example of FIGS. 7A and 7B, it is possible to obtain a rotation of the support structure about the first adjustment axis YY. To this end, as represented in these figures, the plates 16b and 18b remain inactive. In addition, in FIG. 7A, the second cylinders 26 of the plates 16a and 18a are deployed, which allows obtaining a rotation of the support structure about the first adjustment axis YY in the counterclockwise direction. In order to obtain a rotation in the clockwise direction as represented in FIG. 7B, the second cylinders 26 of the plates 16a and 18a are inversely retracted.

Figure 8A:
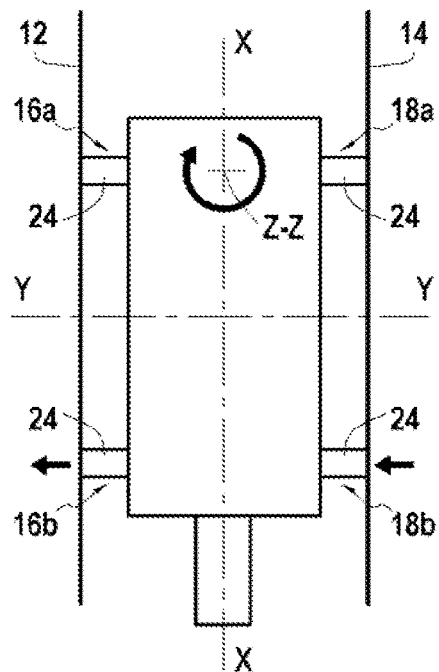
Figure 8B:
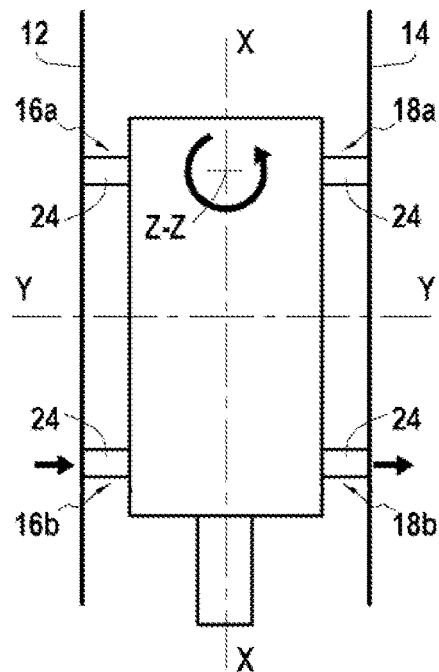

FIGS. 8A and 8B represent, still schematically, rotations of the support structure about the second adjustment axis ZZ reversed from those of FIGS. 6A and 6B.

Thus, in these figures, it is the plates 16a and 18a that remain inactive. In addition, in FIG. 8A, the first cylinder 24 of the plate 16b is retracted and the first cylinder 24 of the plate 18b is deployed, which allows obtaining a rotation of the support structure about the second adjustment axis ZZ in the clockwise direction. Conversely, in FIG. 8B, the first cylinder 24 of the plate 16b is deployed and the first cylinder 24 of the plate 18b is retracted, which allows obtaining a rotation of the support structure about the second adjustment axis ZZ in the counterclockwise direction.

FIGS. 9A and 9B represent rotations of the support structure about the first adjustment axis YY reversed from those of FIGS. 7A and 7B.

Indeed, in these figures, it is the plates 16a and 18a that remain inactive. In addition, in FIG. 9A, the second cylinders 26 of the plates 16b and 18b are deployed so as to obtain a rotation in the counterclockwise direction of the support structure about the first adjustment axis YY. Conversely, in FIG. 9B, the second cylinders 26 of the plates 16b and 18b are retracted so as to obtain a rotation in the clockwise direction of the support structure about the first adjustment axis YY.

FIGS. 10A, 10B, 11A, 11B, 12A, 12B and 13A, 13B illustrate several motions to compensate for stroke deviations between the different cylinders of the plates, these stroke deviations can be typically due to different loads on the plates during the loading.

Thus, in the example of FIGS. 10A and 10B, only the second cylinder of the plate 18a is active (the other cylinders of the other plates remain inactive). In the example of FIG. 10A, this second cylinder is deployed, while in the example of FIG. 10B it is retracted.

Figure 11A:
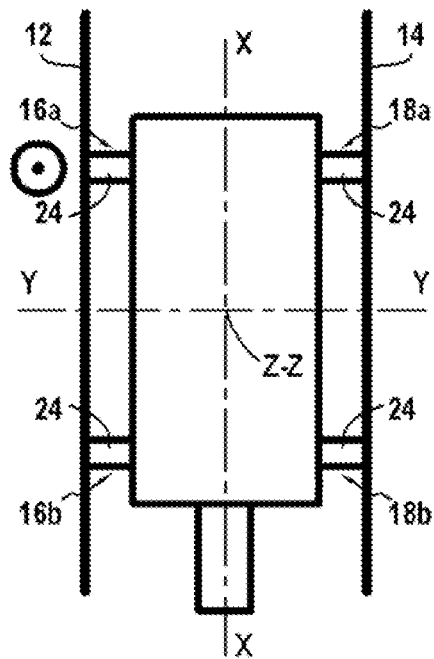
Figure 11B:
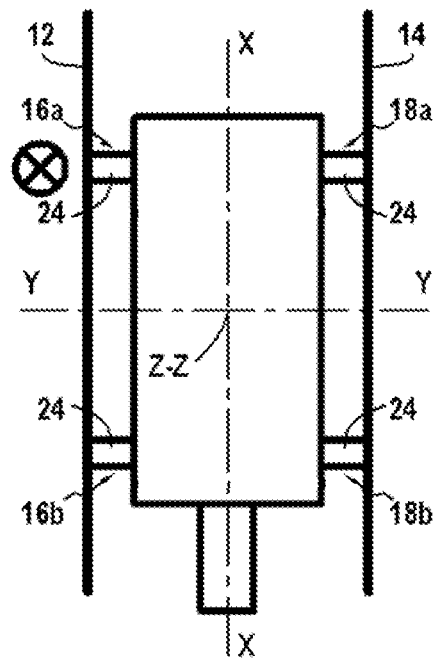

In the example of FIGS. 11A and 11B, only the second cylinder of the plate 16a is active. In the example of FIG. 11A, this second cylinder is deployed, while in the example of FIG. 11B it is retracted.

Figure 12A:
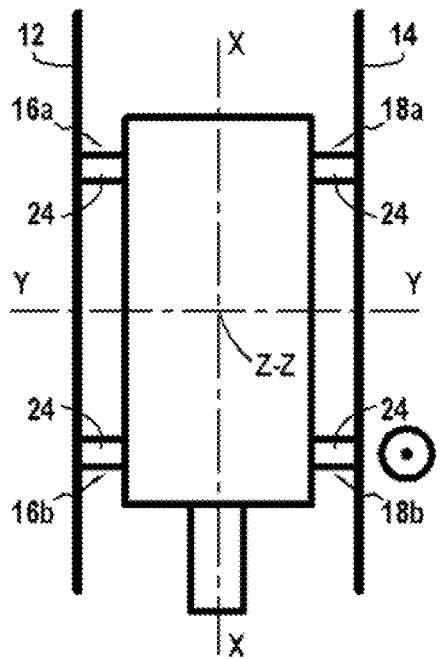
Figure 12B:
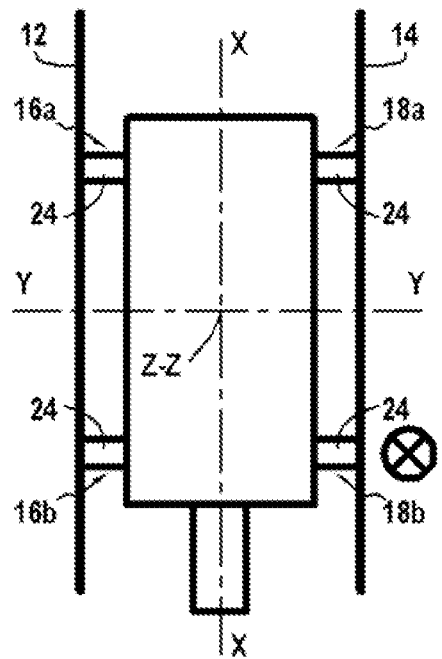

Similarly, in the example of FIGS. 12A and 12B, only the second cylinder of the plate 18b is active. In the example of FIG. 12A, this second cylinder is deployed, while in the example of FIG. 12B it is retracted.

Figure 13A:
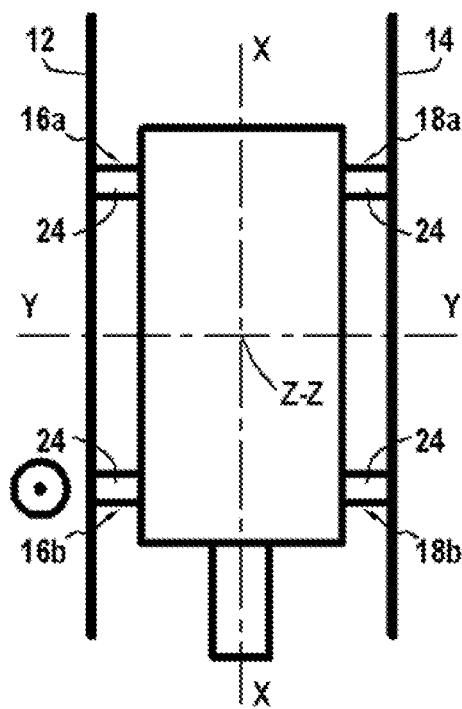
Figure 13B:
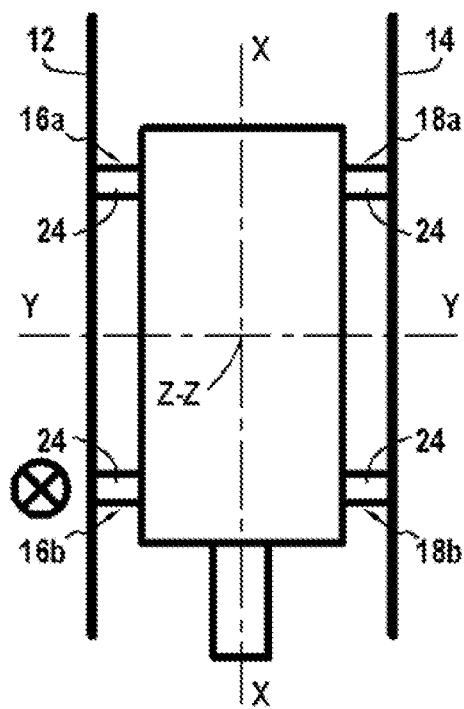

Finally, in the example of FIGS. 13A and 13B, only the second cylinder of the plate 16b is active. In the example of FIG. 13A, this second cylinder is deployed, while in the example of FIG. 13B it is retracted.

Thus, as described above, it is possible, thanks to an individualized control of each cylinder of each plate of the jointing device, to obtain a wide variety of movements and rotations of the support structure on which the pipeline to be jointed is mounted.

The method for jointing subsea pipeline elements to a J-lay tower by means of such a device can be the following.

Initially, the support structure 4 of the jointing device is in a horizontal position so as to be able to mount therein the pipeline 6 to be jointed with the end of the support mounted and clamped on the head support collar. Then, the first cylinder 24 of each plate 16a, 16b, 18a and 18b is placed in the retracted position, while the second cylinder 26 of these plates is deployed in the intermediate position.

The support structure is then pivoted about the first adjustment axis YY (as represented in FIG. 7A) to switch from a horizontal position to an inclined position of the lay tower. The weight of the pipeline is thus taken up by the head support collar.

The rails 12, 14 of the guide structure of the jointing device are then engaged around each plate 16a, 16b, 18a and 18b, and more specifically around their wear parts 30.

All the first cylinders 24 of the plates can then be deployed to allow an abutment of the wear parts 30 of the plates into the rails so as to stabilize the pipeline with respect to the motions of the laying vessel.

An operator then proceeds to the first adjustment along a first direction (for example that of the second adjustment axis ZZ) so as to make the longitudinal axis XX of the pipeline roughly coincide with the standby pipeline element to be jointed, then the operator proceeds along the first adjustment axis YY. Then, the operator repeats these adjustments in order to perfectly joint the pipeline element and the pipeline.

Once the position has been validated by the operator, the hydraulic controls of the cylinders of the different plates are locked for the welding time.

The invention claimed is:

1. A tower for laying a subsea pipeline for transport of fluids, comprising:
    a jointing device; and
    two parallel fixed rails, forming a guide structure and mounting the jointing device to the tower;
    wherein the jointing device includes:
    a support structure capable of being connected to the guide structure and on which a pipeline section to be jointed to a pipeline element is intended to be mounted;
    four plates each comprising a first element capable of cooperating with a first rail of the two parallel fixed rails and a second element fixed on the support structure, the first element and the second element of each plate being linked together by a first cylinder aligned along a first adjustment axis perpendicular to a longitudinal axis of the pipeline section and a second cylinder aligned along a second adjustment axis perpendicular to the longitudinal axis of the pipeline section and to the first adjustment axis; and
    a system for controlling the cylinders of the plates to achieve movements along the first and the second adjustment axis and capable of cooperating jointly with a set of cylinders for guiding in translation the support structure along the longitudinal axis of the pipeline section so as to allow jointing of the pipeline section and of the pipeline element.

2. The tower according to claim 1, wherein the jointing device comprises two plates fixed on one side of the support structure and each cooperating with the first rail of the two parallel fixed rails, and two other plates fixed on an opposite side of the support structure and each cooperating with a second rail of the two parallel fixed rails, the plates located on a same side of the support structure being spaced from each other along the longitudinal axis of the pipeline section.

3. The tower according to claim 2, wherein the plates located on either side of the support structure are aligned in pairs with each other along the first adjustment axis.

4. The tower according to claim 1, wherein the cylinders of the plates are hydraulic cylinders which are linked to the system for controlling.

5. The tower according to claim 1, wherein the jointing device further comprises a head support collar on which the support structure of the pipeline section is intended to be held and intended to take up force generated during the translation of the support structure along the longitudinal axis of the pipeline section.

6. The tower according to claim 1, wherein the first element of each plate cooperates with one of two parallel fixed rails via a wear part.

7. The tower according to claim 1, wherein the two parallel fixed rails are metal profiles with a U-shaped section.

8. The tower according to claim 1, wherein the support structure is configured and dimensioned to pivot about the first adjustment axis to switch from a horizontal position to an inclined position.

9. The tower according to claim 1, wherein the tower is a J-lay tower.

* * * * *